United States Patent
Kim et al.

(10) Patent No.: US 10,312,575 B2
(45) Date of Patent: Jun. 4, 2019

(54) WEARABLE DEVICE ANTENNAS

(71) Applicant: Galtronics Corporation Ltd., Tiberias (IL)

(72) Inventors: Bumjin (Martin) Kim, Gyeonggi-do (KR); Sunkil (Edgar) Choi, Gyeonggi-do (KR); Jae Hun (Daniel) Gim, Gyeonggi-do (KR); Sangyup (Andrea) Kim, Gyeonggi-do (KR); Suhyun (Edwin) Kim, Gyeonggi-do (KR); Jaeyun (Louis) Hwang, Gyeonggi-do (KR)

(73) Assignee: GALTRONICS USA, INC., Tempe, AZ (US)

( * ) Notice: Subject to any disclaimer, the term of this patent is extended or adjusted under 35 U.S.C. 154(b) by 48 days.

(21) Appl. No.: 15/300,932

(22) PCT Filed: Mar. 31, 2015

(86) PCT No.: PCT/IB2015/000994
§ 371 (c)(1),
(2) Date: Sep. 30, 2016

(87) PCT Pub. No.: WO2015/166345
PCT Pub. Date: Nov. 5, 2015

(65) Prior Publication Data
US 2017/0025743 A1    Jan. 26, 2017

Related U.S. Application Data

(60) Provisional application No. 61/972,577, filed on Mar. 31, 2014.

(51) Int. Cl.
*H01Q 1/27*    (2006.01)
*H04Q 1/22*    (2006.01)
(Continued)

(52) U.S. Cl.
CPC ............. *H01Q 1/273* (2013.01); *G02C 11/10* (2013.01); *H01Q 1/2291* (2013.01); *H01Q 1/44* (2013.01);
(Continued)

(58) Field of Classification Search
CPC ...... H01Q 1/273; H01Q 1/2291; H01Q 5/378; H01Q 9/42; H01Q 7/00; H01Q 1/44;
(Continued)

(56) References Cited

U.S. PATENT DOCUMENTS

2008/0001833 A1    1/2008  Kaneoya
2010/0328182 A1   12/2010  Wong et al.
(Continued)

FOREIGN PATENT DOCUMENTS

EP    2182642 A2    5/2010
EP    2562870 A1    2/2013
(Continued)

OTHER PUBLICATIONS

EPO, International Search Report for International Application No. PCT/IB2015/000994, dated Nov. 18, 2015.
(Continued)

*Primary Examiner* — Hai V Tran
*Assistant Examiner* — Michael M Bouizza
(74) *Attorney, Agent, or Firm* — Lorenz & Kopf, LLP

(57) ABSTRACT

Antennas for wearable wireless devices are provided. A wearable wireless device antenna may include a primary radiating element configured to form at least a portion of a wearable device body and a secondary radiating element configured to couple to the primary radiating element. Each of the primary and secondary radiating elements may be configured to radiate in differing frequency ranges. Wearable device antennas as provided may further be configured as directional antennas.

7 Claims, 7 Drawing Sheets

(51) Int. Cl.
  *H01Q 7/00* (2006.01)
  *H01Q 9/42* (2006.01)
  *G02C 11/00* (2006.01)
  *H01Q 1/44* (2006.01)
  *H04B 1/3827* (2015.01)
  *H01Q 5/378* (2015.01)
  *H01Q 1/22* (2006.01)
  *G04R 60/06* (2013.01)

(52) U.S. Cl.
  CPC ............... *H01Q 5/378* (2015.01); *H01Q 7/00* (2013.01); *H01Q 9/42* (2013.01); *H04B 1/385* (2013.01); *G04R 60/06* (2013.01); *H04B 2001/3866* (2013.01)

(58) Field of Classification Search
  CPC   G02C 11/10; H04B 1/385; H04B 2001/3866; G04R 60/06
  See application file for complete search history.

(56) References Cited

U.S. PATENT DOCUMENTS

2014/0266939 A1\* 9/2014 Baringer ................ H01Q 21/28
                                                              343/729
2016/0056526 A1\* 2/2016 Li ........................... H01Q 9/42
                                                              343/702

FOREIGN PATENT DOCUMENTS

JP    2002247484 A    8/2002
WO    2009157605 A1   12/2009

OTHER PUBLICATIONS

EPO, Written Opinion issued in International Application No. PCT/IB2015/000994, dated Nov. 18, 2015.

\* cited by examiner

WEARABLE DEVICE ANTENNAS

RELATED APPLICATION

This application is a U.S. National-Stage entry under 35 U.S.C. § 371 based on International Application No. PCT/IB2015/000994, filed Mar. 31, 2015, which was published under PCT Article 21(2) and which claims the benefit of priority under 35 U.S.C. § 119(e) to U.S. Provisional Application No. 61/972,577, filed Mar. 31, 2014, which are all incorporated herein by reference.

TECHNICAL FIELD

The present disclosure relates to antenna structures for wireless devices. Wireless devices described herein may be used for mobile broadband communications.

SUMMARY

Embodiments of the present disclosure include a wearable wireless device antenna. The antenna may include a primary radiating element configured to form at least a portion of a wearable device body, a secondary radiating element configured to couple to the primary radiating element, and a feed element, configured to feed a radiofrequency signal to the secondary radiating element. The primary radiating element may be configured to radiate in a first frequency range when the secondary radiating element receives a first radiofrequency signal in the first frequency range from the feed line and couples the first radiofrequency signal to the primary radiating element, and the secondary radiating element may be configured to radiate in a second frequency range when receiving a second radiofrequency signal in the second frequency range.

A wearable device consistent with the present disclosure may include a body having a housing, at least one conductive element disposed on the housing and configured to form at least a portion of a primary radiating element, a secondary radiating element configured to couple with the primary radiating element, and a feed line disposed to supply a radiofrequency signal to the secondary radiating element. The primary radiating element may be configured to radiate in a first frequency range when the secondary radiating element receives a first radiofrequency signal in the first frequency range from the feed line and couples the first radiofrequency signal to the primary radiating element, and the secondary radiating element may be configured to radiate in a second frequency range when receiving a second radiofrequency signal in the second frequency range.

DETAILED DESCRIPTION OF THE EMBODIMENTS

Figure 1:
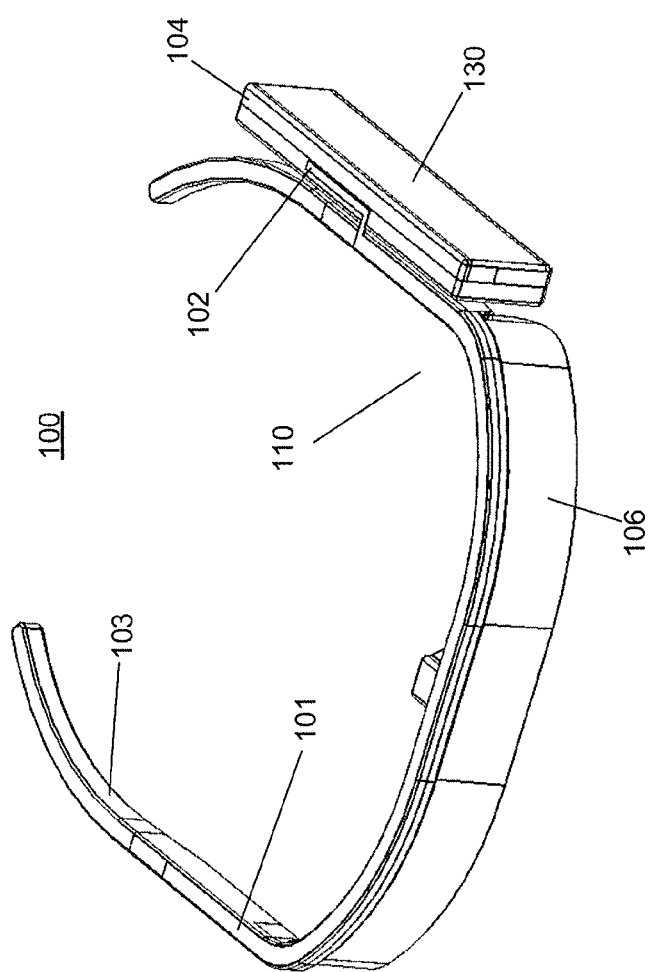
FIG. 1 illustrates an exemplary wearable device antenna consistent with the disclosure.

Reference will now be made in detail to exemplary embodiments of the present disclosure, examples of which are illustrated in the accompanying drawings. Wherever possible, the same reference numbers will be used throughout the drawings to refer to the same or like parts.

Embodiments of the present disclosure relate generally to wide bandwidth antennas provided for use in wireless wearable devices. Multi-band antennas consistent with the present disclosure may be employed in mobile devices for cellular communications, and may operate at frequencies ranging from approximately 700 MHz to approximately 2.7 GHz. Multi-band antennas consistent with the present disclosure may further be employed for any type of application involving wireless communication and may be constructed to operate in appropriate frequency ranges for such applications. Multi-band antennas consistent with the present disclosure may include dual branched antennas configured to operate in multiple frequency bands.

As used herein, the term "antenna" may collectively refer to the structures and components configured to radiate radiofrequency energy for communications. The term antenna may collectively refer to the multiple conductive components and elements combining to create a radiating structure. The term antenna may further include additional tuning, parasitic and trim elements incorporated into a wireless device to improve the function of radiating structures. The term antenna may additionally include discreet components, such as resistors, capacitors, and inductors and switches connected to or incorporated with antenna components. As used herein, the term antenna is not limited to those structures that radiate radiofrequency signals, but also includes structures that serve to feed signals to radiating structures as well as structures that serve to shape or adjust radiation patterns.

Multi-band antennas consistent with the present disclosure may be efficacious for providing wideband communications in cellular frequency ranges, e.g., between 700 MH and 2.7 GHz. Multi-band antennas consistent with the present disclosure may be incorporated into wearable wireless devices. As used herein, the term "wearable device" refers to a device intended to be worn by a user, rather than carried in a user's hand. Such devices may be worn by a user via straps, buckles, belts, clasps, etc. Such devices may be attached to or integral with other articles of clothing, such as shirts, pants, hats, etc. Wearable devices consistent with the disclosure may also be worn via structural frames, such as those used in eye-glass frames or head-phones. While the disclosure discusses specific form factors for wearable wireless devices for illustrative purposes, it is understood that the disclosed wearable device antennas are not limited to the wearable device form factors discussed herein. Specific wearable wireless devices discussed herein may include, for example, head mounted devices, wrist mounted devices, and others. Head mounted wearable devices may include glasses, and may also include other devices having the form factor of glasses without necessarily providing the function of traditional glasses. For example, a head mounted wearable device may include a screen suspended in front of a user's eye, without providing any aid to the user's vision. Wrist mounted devices may include watches, but are not limited to the traditional functions of a watch, and may, for example, incorporate all of the functionality of a tablet, computer, or smart phone in the form factor of a wrist-watch.

Wearable device antennas consistent with the present disclosure may be configured for directional radiation. When a wireless device is worn on or close to the body of a user, the user's body may disrupt or otherwise interfere with radiofrequency signals transmitted by the device. If a wireless device worn on or close to the body transmits radiation in an omni-directional pattern, a significant percentage of the transmitted radiation may be absorbed by the body of the user, resulting in a lower overall efficiency of the device. In contrast, wearable devices provide with antennas configured for directional radiation may be designed or configured to transmit a larger portion of the radiofrequency energy away from the body of the user, thereby increasing an efficiency of the device as a whole.

As used herein, an antenna configured for directional radiation is an antenna configured such that, when operating under expected usage conditions, greater radiofrequency energy is radiated in one or more high-gain directions in a manner intended to improve performance. The directionality of an antenna may be described based on an imaginary sphere surrounding the antenna. For example, a directional antenna may radiate greater energy in a high-gain direction through one hemisphere of the imaginary sphere as compared to a low-gain direction through another hemisphere. A directional antenna may radiate greater energy over a relatively small portion of the sphere, and thus transmit a cone shaped beam of radiofrequency energy. A directional antenna may be configured to transmit 1.5, 2, 4, 5, 10, 100, or more times more strongly in a high-gain direction as compared to a low-gain direction.

FIG. 1 illustrates portions of an exemplary wearable device antenna 110 consistent with the disclosure. The wearable device 100 illustrated in FIG. 1 is a head mounted wireless device taking the form factor of a pair of glasses. In FIG. 1, a portion of the wearable device antenna 110 is visible. FIG. 1 illustrates a primary radiating element 101, a coupling element 102, a wearable device body 103, a wearable device circuitry housing 104, a ground plane 130, and a device display 106. Additional elements of wearable device antenna 110 may be located inside circuitry housing 104.

Figure 2:
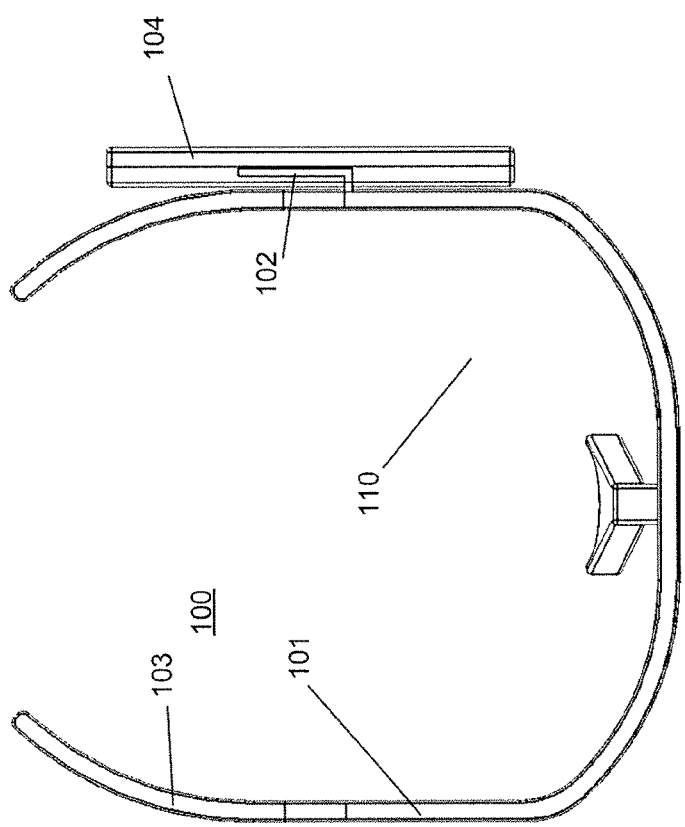
FIG. 2 illustrates an exemplary wearable device antenna consistent with the disclosure.

FIG. 2 illustrates a top down view of wearable device 100 having a wearable device antenna 110 consistent with the present disclosure. Similarly to FIG. 1, FIG. 2 illustrates primary radiating element 101, coupling element 102, wearable device body 103, device display 106, and wearable device circuitry housing 104. Device display 106 may provide visual output to a user of wearable device 100.

Figure 3:
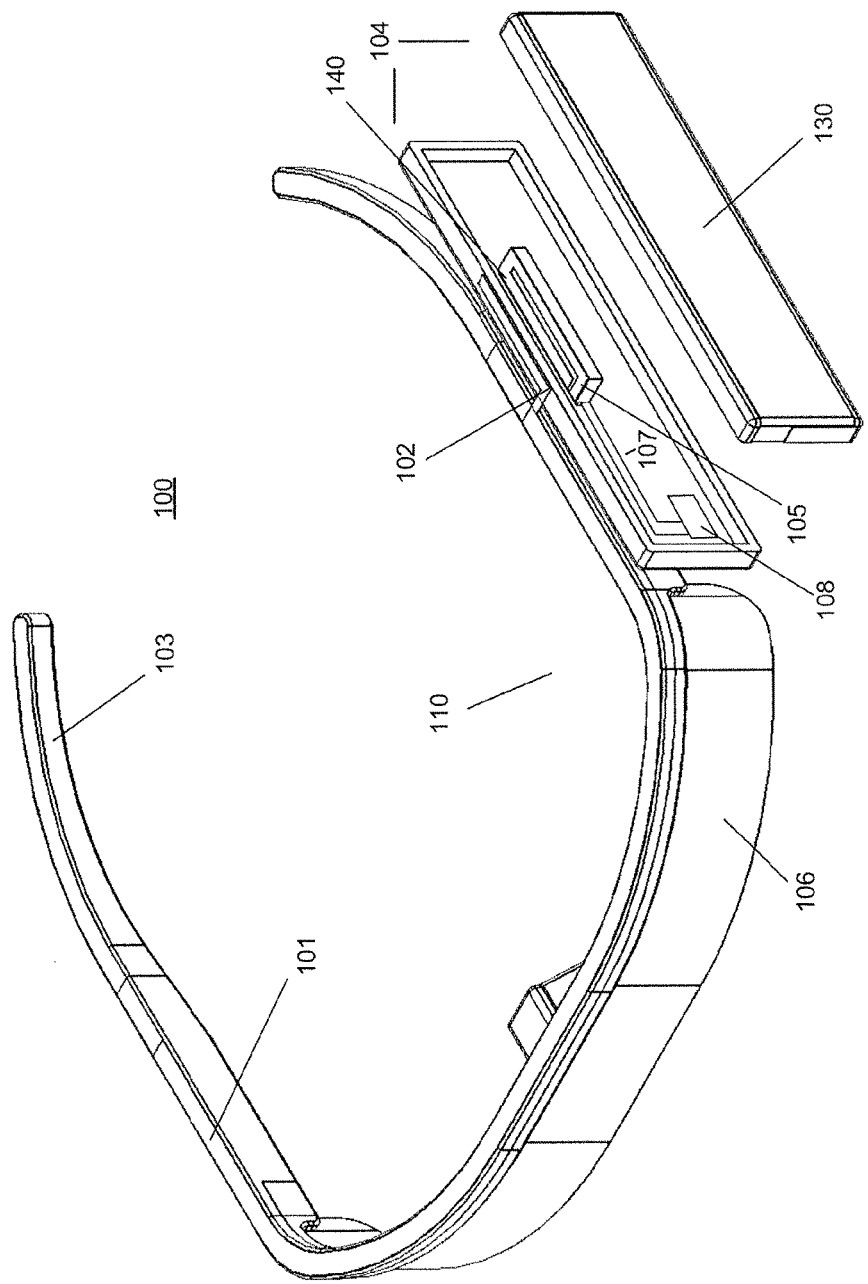
FIG. 3 illustrates an exploded view of aspects of an exemplary wearable device antenna consistent with the disclosure.

FIG. 3 illustrates an exploded perspective view of additional aspects of exemplary wearable device antenna 110. In FIG. 3, circuitry housing 104 is shown with a cover removed to make secondary radiating element 105 visible. Secondary radiating element 105 may be housed in circuitry housing 104 and may be connected to wireless device circuitry 108 via feed line 107. Wireless device circuitry 108 may include any and all of the elements necessary for transmission and reception of wireless signals, e.g., a transmitter, a receiver, a processor, signal conditioning circuitry, etc. Also illustrated in FIG. 3 are primary radiating element 101, coupling element 102, device display 106, ground plane 130, and wearable device body 103.

As illustrated in FIGS. 1-3, primary radiating element 101 may be configured to form at least a portion of a body 103 of the wearable device 100. For example, primary radiating element 101 may be configured to form at least a portion of an external frame of wearable device 100. FIG. 3 illustrates primary radiating element 101, which may be a conductive metallic element, disposed along an outer periphery of the head-mounted device. In FIG. 3, where the head-mounted device may take the form factor of eye-glasses, primary radiating element 101 may form a portion of the eyeglass frame. As shown in FIG. 3, primary radiating element 101 may form an external portion of the eyeglass frame. In alternative embodiments, primary radiating element 101 may not be external, and may, for example, be embedded within a body of wearable device 100. Locating primary radiating element 101 in this fashion may provide primary radiating element 101 with extended electrical length, which may serve to improve performance. As used herein, the term "electrical length" refers to the length of a feature as determined by the portion of a radiofrequency signal that it may accommodate. For example, a feature may have an electrical length of $\lambda/4$ (e.g., a quarter wavelength) at a specific frequency. An electrical length of a feature may or may not correspond to a physical length of a structure, and may depend on radiofrequency signal current pathways. Features having electrical lengths that appropriately correspond to intended radiation frequencies may operate more efficiently. For example, primary radiating element 101 may be configured as a ¼ wave or as a ½ wave element in low band frequencies, e.g., 600-960 MHz. Also as shown in FIG. 3, primary radiating element 101 may be shaped so as to wrap at least partially around a body part of a user. In the case of a head-mounted wearable device, primary radiating element 101 may be shaped so as to wrap at least partially around a head of the user. As shown in FIG. 3, primary radiating element 101 may wrap around three sides of a head. In some embodiments, primary radiating element 101 may wrap around two or four sides as well.

Primary radiating element 101 may be configured for galvanic connection to coupling element 102. In some embodiments, coupling element 102 may couple to primary radiating element 101 through reactive coupling, rather than galvanically.

Coupling element 102 may be located adjacent to secondary radiating element 105, and may couple, inductively or capacitively, to secondary radiating element 105, located inside circuitry housing 104. Coupling between coupling element 102 and secondary radiating element 105 may occur through a wall of circuitry housing 104. Secondary radiating element 105 may be configured, as illustrated in FIG. 3, as a folded monopole radiating element. At least a portion of secondary radiating element 105 may be located in a substantially parallel configuration with at least a portion of coupling element 102, for example, to facilitate coupling between the two. Secondary radiating element 105 may also be configured with alternative antenna structures that may be suitable.

Secondary radiating element 105 may receive a radiofrequency signal for transmission from wireless device circuitry 108 via feed line 107. Ground plane 130, may be a conductive layer on device housing 104, as illustrated, and may also be located inside device housing 104, or even embedded within the structure of device housing 104.

In operation, wearable device antenna 110 may function as a multi-band antenna, transmitting in high-band frequencies between 1710-2700 MHz and low-band frequencies between 600-960 MHz. When provided with a low-band radiofrequency signal via feed line 107, secondary radiating element 105 may couple to and activate primary radiating element 101 via coupling element 102. Primary radiating element 101, activated via coupling element 102, may provide sufficient electrical length for efficient transmission in low-band frequency ranges, for example, by operating as a quarter wave monopole. When provided with a high-band radiofrequency signal via feed line 107, radiating element may be configured to radiate in the high band as a quarter wave folded monopole. In both high-band and low-band operation, ground plane 130 may function as a counterpoise for wearable device antenna 110.

Wearable device antenna 110 may be configured for directional radiation. As illustrated in FIGS. 1-3, wearable device 100 may be configured as a head-mounted device. Thus, wearable device antenna may be configured to radiate radiofrequency energy away from the head of the wearer, in order to increase transmission efficiency. For example, when operating in a low-band range, primary radiating element 101 of wearable device 100 may activate and transmit radiofrequency energy with greater power outward from the sides it wraps around. Thus, high-gain directions for primary radiating element 101 may those directions facing outward from the sides and front of the head. When taking an eye-glass form factor, wearable device 100 may be configured to radiate greater power in directions away from the front and sides of the head, and less power towards the front and sides of the head.

Secondary radiating element 105, which may be configured to radiate in a high-band, as discussed above, may also radiate directionally. For example, secondary radiating element 105 may radiate more strongly in a high-gain direction through a hemisphere facing away from the head, and less strongly in a low-gain direction through a hemisphere facing towards the head.

In some embodiments, the radiation patterns of secondary radiating element 105 and primary radiating element 101 may be affected or altered by the user's head. For example, when measured in free space, radiation patterns of wearable device 100 may display different directionality than when measured in use, e.g., when located on a head of a user. The presence of the user's head may increase the directionality of the antenna in high-gain directions away from the head. Primary radiating element 101 and secondary radiating element 105, may thus be configured for increased directionality away from a user's body when placed in proximity to a user's body.

In some embodiments, wearable device antenna 110 may be configured with a slit-fed structure for activating primary radiating element 101. Slit-fed architecture may use a slit or a gap between a radiating element and an element configured to feed a radiofrequency signal to the radiating element. In some embodiments that include a slit-fed architecture, the radiating element and the feeding element include portions in close proximity to one another, with only the slit or gap in between. The slit or gap may be of constant or variable width.

When the feed element receives a radiofrequency signal, via, e.g., a feed line, the feed element may couple to the radiating element, via inductive and/or capacitive coupling, across the gap or slit, thus activating the radiating element. The width and length of the slit or gap may vary based on a frequency range at which the radiating element is to be activated. The slit may be partially or completely filled by a dielectric material, such as air, plastic, Teflon, or other dielectric.

Slit-fed architecture may increase the efficiency of the antenna by permitting a distributed feed. In conventional monopole designs, an antenna may be fed at a feed location on one end, and the feed line may be sized to deliver a radiofrequency signal having appropriate current characteristics at the feed point. That is, the radiofrequency signal feed point must take into account the electrical length and the electrical impedance of antenna in order to permit optimum efficiencies. It may be difficult, however, to optimize such a design across a wide frequency range. A distributed feed system enabled by slit-fed architecture may address this issue by providing a range of potential feeding locations throughout the length of the slit. In operation, radiofrequency signals of different frequencies (and different wavelengths) may couple from the feed element to the radiating element at different points along the portion the feed element located in proximity to the radiating element across the slit.

Such a distributed feed may also permit the activation of multiple current pathways resonant at differing frequencies. For example, if a resonant structure may resonate at two disparate frequencies within a low frequency band a distributed slit fed structure may permit the resonant structure to receive radiofrequency signals at multiple locations along the slit, where each signal is appropriately matched to the resonant structure in terms of electrical length and impedance. These features of slit fed architecture may permit a designer to optimize performance in specific frequency ranges, by optimizing each resonant structure in its activation frequency range.

As discussed above, wearable device antenna 110 may employ a slit fed architecture. Slit 140 may be located between secondary radiating element 105 and coupling element 102. Coupling across the slit may provide the advantages described above, as well as additional advantages to a head mounted wearable device. When arranged close to the head of a user, wearable device 100 may experience electrical interactions with the user, if, for example, primary radiating element 101 contacts the skin of the user. Such contacts may alter the effective electrical length of primary radiating element 101. The distributed feeding nature of slit 140 may permit dynamic and automatic adjustment of the feed to account for such alterations.

Figure 4:
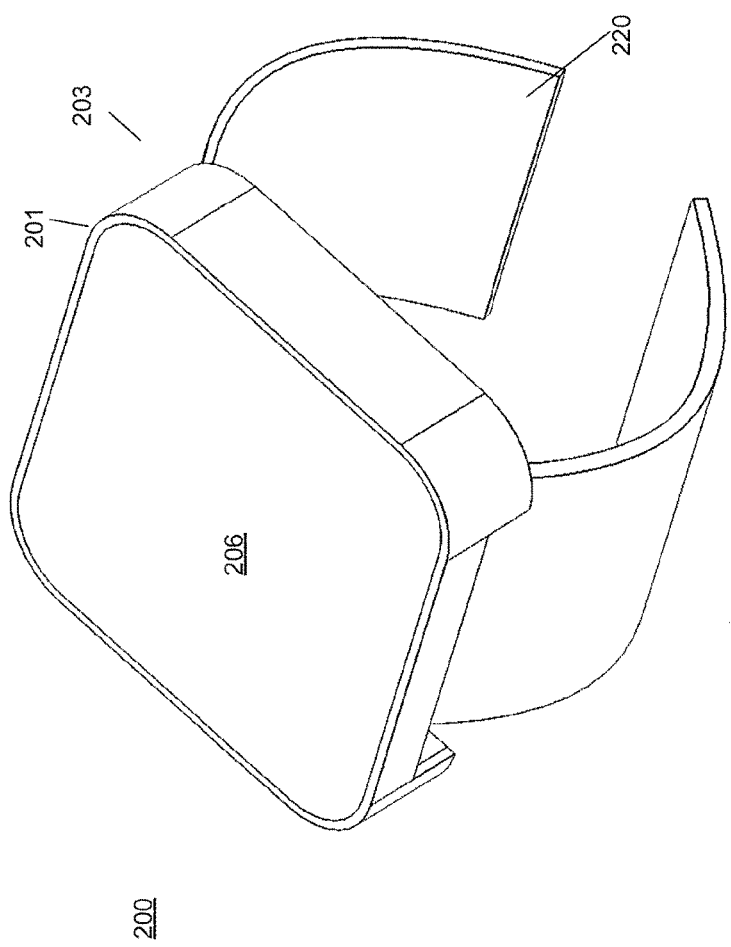
FIG. 4 illustrates a perspective view of a wearable device antenna consistent with the present disclosure.

Alternative embodiments of a wearable device including a wearable device antenna may include a wrist-mounted device. FIG. 4 illustrates an exemplary wrist-mounted wearable device 200 consistent with the present disclosure. Wearable device 200 may include a device main body 203, a device strap 220, and a device screen 206. Wearable device 200 may further include a primary radiating element 201.

Figure 5:
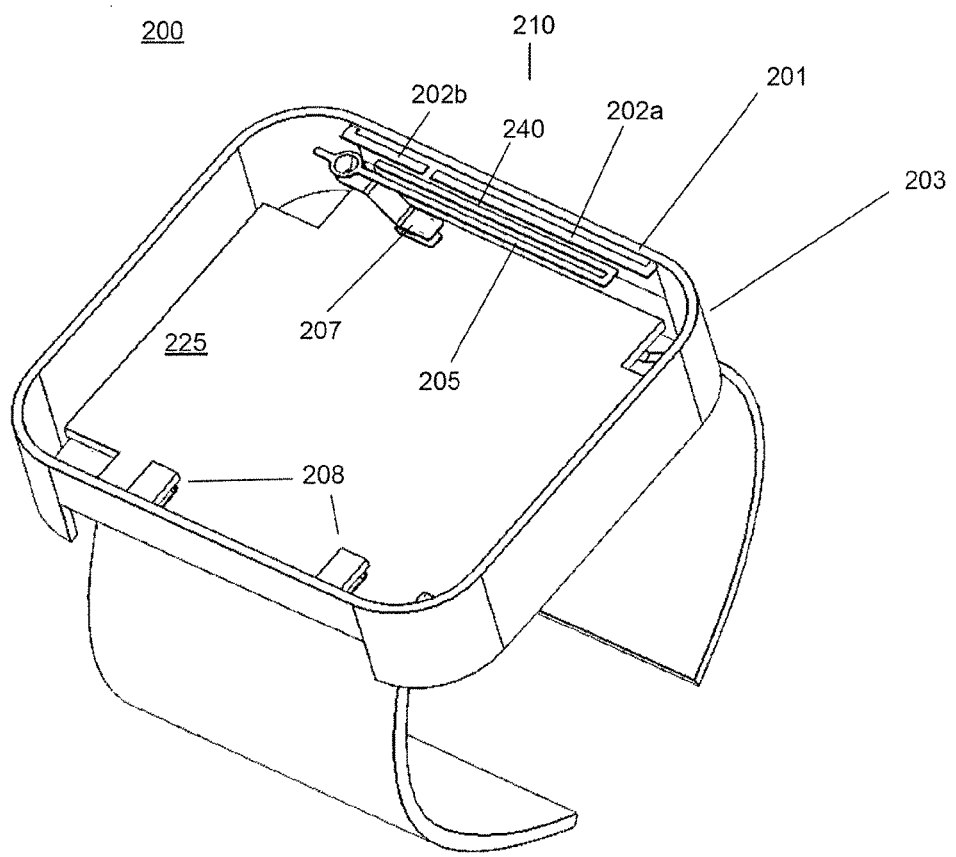
FIG. 5. illustrates a perspective cut-away view of an exemplary wearable device antenna consistent with the present disclosure

FIG. 5 is a perspective view of wearable device 200, illustrating additional aspects. FIG. 5 illustrates wearable device antenna 210, including primary radiating element 201, first and second coupling portions 202a, 202b, secondary radiating element 205, device body 203, PCB connections 208, and feed point 207.

Figure 6:
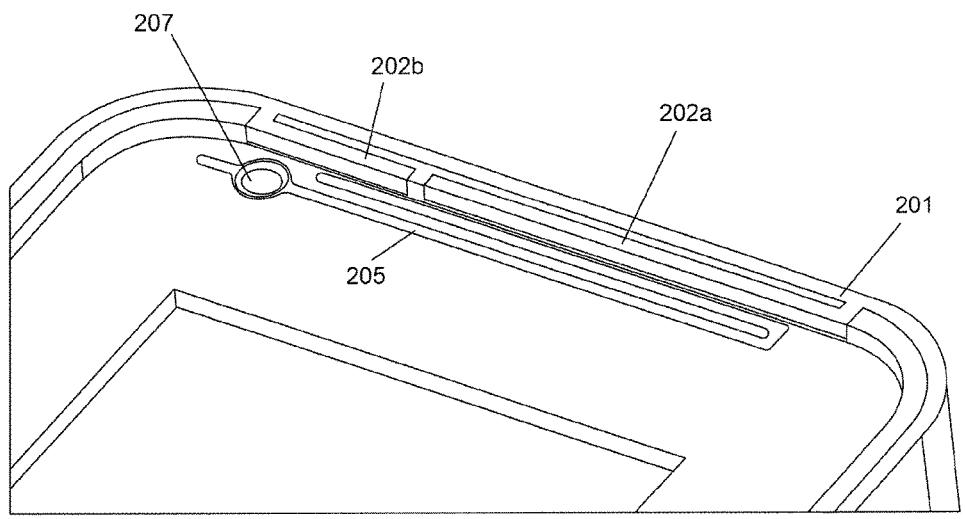
FIG. 6 illustrates an expanded perspective view of some aspects of an exemplary wearable device antenna consistent with the present disclosure.

FIG. 6 is a close-up perspective view of wearable device 200. FIG. 6 illustrates wearable device antenna 210, including primary radiating element 201, first and second coupling portions 202a, 202b, secondary radiating element 205, and feed point 207.

As illustrated in FIGS. 4-6, primary radiating element 201 may be configured to form at least a portion of a body 203 of the wearable device 200. For example, primary radiating element 201 may be configured to form at least a portion of an external frame of wearable device 200. FIG. 5 illustrates primary radiating element 201, which may be a conductive metallic element, disposed along an outer periphery of the wrist-mounted device. In FIG. 5, where the wrist-mounted device may take the form factor of a wrist-watch, primary radiating element 201 may form at least a portion of the watch body. As shown in FIG. 5, primary radiating element 201 may form an external portion of the watch body. Primary radiating element 201 may be connected to a PCB board of wearable device 200 via PCB connections 208. In alternative embodiments, primary radiating element 201 may not be external, and may, for example, be embedded within a body or case of wearable device 200. In some embodiments, primary radiating element 201 may form a gapless frame around device body 203. In alternative embodiments, primary radiating element 201 may include a gap (as illustrated in greater detail in FIGS. 7a and 7b).

Locating primary radiating element 201 along an outer periphery of wearable device 200 may provide primary radiating element 201 with extended electrical length, which may improve performance. In some embodiments, because of limitations on the size of a wrist-mounted device, primary radiating element 201 may have an electrical length less than a quarter wavelength and still feature excellent performance when worn on the body. Also as shown in FIG. 5, primary radiating element 201 may be configured to form a loop (or in some embodiments a partial loop) in a plane approximately perpendicular to a surface of a user's body. For example, when wearable device 200 is worn as a watch, primary radiating element 201 forms a loop in a plane approximately parallel to the skin of the user's wrist.

Primary radiating element 201 may be configured for galvanic connection to first and second coupling elements 202a, 202b. In some embodiments, coupling elements 202a, 202b may couple to primary radiating element 201 through reactive coupling, rather than galvanically. Coupling elements 202a, 202b may couple, inductively or capacitively, to secondary radiating element 205, located inside device body 204. Secondary radiating element 205 may be configured, as illustrated in FIG. 5, as a folded monopole radiating element. Secondary radiating element 205 may also be configured with alternative antenna structures that may be suitable. Secondary radiating element 205 may receive a radiofrequency signal for transmission from wireless device circuitry via feed point 207.

In some embodiments, wearable device antenna 210 may employ slit fed architecture. Wearable device antenna 201 may include a slit 240 between coupling elements 202a, 202b, and secondary radiating element 205. Secondary radiating element 205 may couple to coupling elements 202a and 202b across slit 240. Slit 240 may provide a distributed feed, permitting secondary radiating element 205 to excite primary radiating element 201 to activate in a wide frequency range. Slit 240 may also permit the activation of multiple current pathways having differing electrical lengths between the conductive coupling elements 202a, 202b, and primary radiating element 201.

In operation, wearable device antenna 210 may function as a multi-band antenna, transmitting in high-band frequencies between 1710-2700 MHz and low-band frequencies between 600-960 MHz. When provided with a low-band radiofrequency signal via feed line 207, secondary radiating element 205 may couple to and activate primary radiating element 201 via coupling elements 202a and 202b. Primary radiating element 201, activated via coupling elements 202a and 202b, may provide sufficient electrical length for efficient transmission in low-band frequency ranges. When provided with a high-band radiofrequency signal via feed line 207, secondary radiating element 205 may be configured to radiate as a folded monopole, utilizing primary radiating element 201 as a counterpoise. Secondary radiating element 205 may also be configured to couple to at least coupling element 202b and to cause at least a portion of primary radiating element 201 and coupling element 202b to cooperate to radiate in the high-band frequency range.

Wearable device antenna 210 may be configured for directional radiation. As illustrated in FIGS. 4-6, wearable device 200 may be configured as a wrist-mounted device. Thus, wearable device antenna 210 may be configured to radiate radiofrequency energy away from the wrist of the wearer to increase transmission efficiency. For example, when operating in a low-band range, primary radiating element 201 of wearable device 200 may activate and transmit radiofrequency energy with greater power outward from the wrist. Thus, high-gain directions for primary radiating element 201 may include those directions that radiate hemispherically away from a wrist-side face of the wrist mounted device.

Secondary radiating element 205, which may be configured to radiate in a high-band, as discussed above, may also radiate directionally. For example, secondary radiating element 205 may radiate more strongly in a high-gain direction through a hemisphere facing away from the wrist, and less strongly in a low-gain direction through a hemisphere facing towards the wrist.

In some embodiments, the radiation patterns of secondary radiating element 205 and primary radiating element 201 may be affected or altered by the user's wrist. For example, when measured in free space, radiation patterns of wearable device 200 may display different directionality as well as differing levels of efficiency than when measured in use, e.g., when located on a wrist of a user. The presence of the user's wrist may increase the directionality of the antenna in high-gain directions away from the wrist. Primary radiating element 201 and secondary radiating element 205 may thus be configured for increased directionality away from a user's body when placed in proximity to a user's body. Primary radiating element 201 and secondary radiating element 205 may also be configured for increased performance away from a user's body when placed in proximity to a user's body.

In some embodiments, the walled shape of primary radiating element 201 may be configured to channel radiofrequency energy in a high-gain direction towards the face of wearable device 200. In some embodiments, the presence of a user's wrist at the base of this channel may enhance the directionality of the antenna.

When employed in a wrist-mounted wearable device 200, primary radiating element 201 of wearable device antenna 210 may, as noted above, have an electrical length less than a quarter wavelength in the low frequency band. In some conventional antenna designs, performance efficiency may suffer with such short electrical lengths. In embodiments discussed herein, however, combinations of the discussed features may cooperate to provide excellent performance in low band (600-960) frequency ranges, despite the short length of the primary radiating element 201. For example, the walled shape of primary radiating element 201, as described above, may serve to increase the directionality of the wearable device 210, and thus provide increased performance over an omni-directional antenna of similar size. Furthermore, the use of slit-fed architecture, as described above, may provide for more efficient coupling of the radiofrequency signal to primary radiating element 201, and thus increase performance of the antenna as a whole. Additionally, because wearable device antenna 210 may be configured for increased performance and directionality when in proximity to a user's body, wearable device antenna 210 may provide unexpectedly increased performance over an antenna that is not so configured.

Figure 7A:
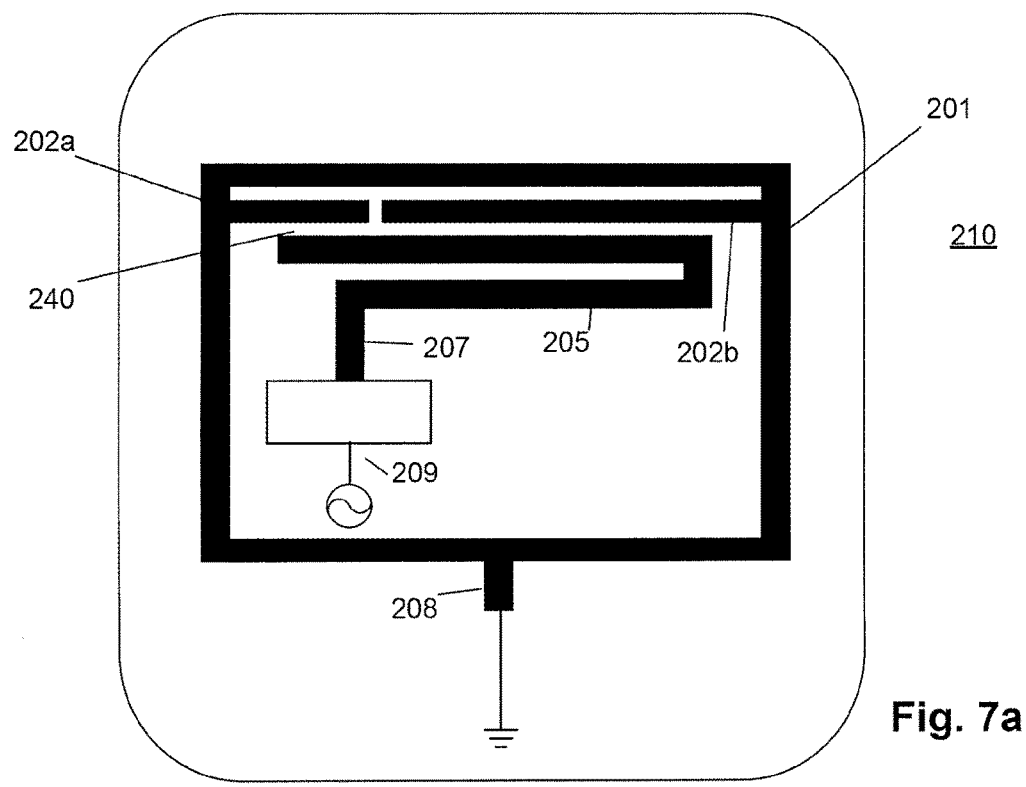
FIGS. 7a and 7b illustrate schematic drawings of a multi-coupling wearable device antenna consistent with the disclosure.
Figure 7B:
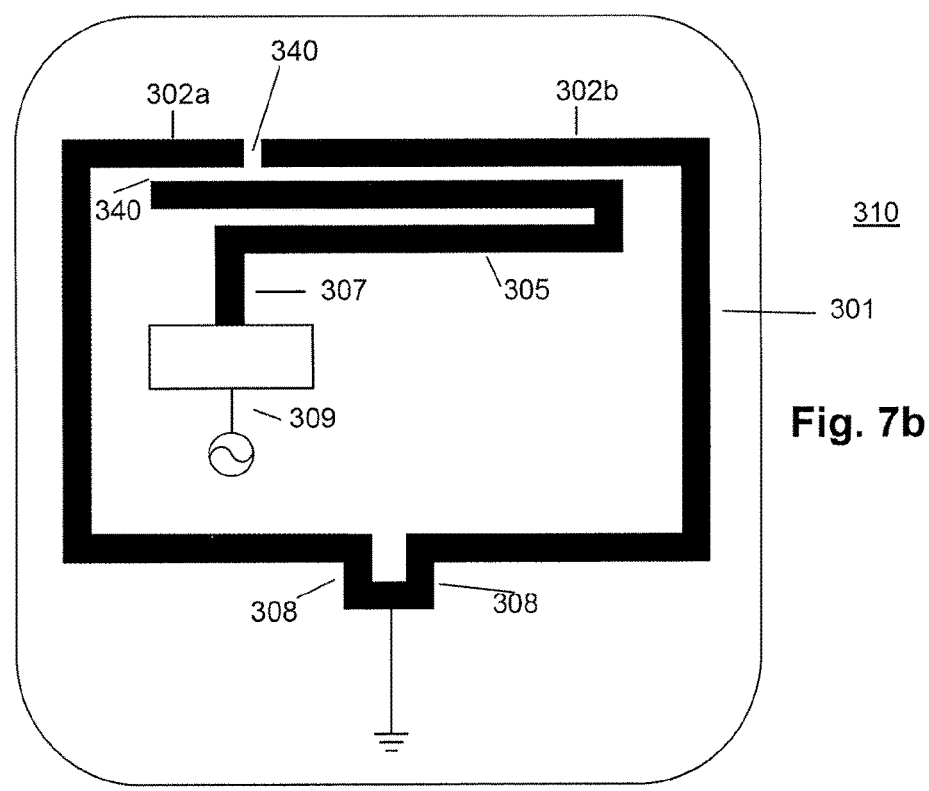

FIGS. 7a and 7b provide a comparison between wearable device antenna 210 and an alternative embodiment of wearable device antenna 310. FIG. 7a illustrates a gapless design for a wrist mounted device antenna, and FIG. 7b illustrates a gapped design for a wrist mounted device antenna.

FIG. 7a schematically illustrates the features previously discussed with respect to FIGS. 4-6. Wearable device antenna 210 may include primary radiating element 201, secondary radiating element 205, coupling elements 202a, 202b, feed line 207, PCB connections 208, and wireless device circuitry 209. Wireless device circuitry 209 may include any and all components required for transmission and reception of a wireless signal.

FIG. 7b schematically illustrates an alternative embodiment of a wrist-mounted device antenna, including a gap 340 in primary radiating element 301. Gap 340 may be a non-conductive portion of the wearable device body that separates coupling portions 302a and 302b of primary radiating element 301 from one another. Wearable device antenna 310 may include primary radiating element 301, secondary radiating element 305, coupling portions 302a, 302b, feed line 307, ground connector 308, and wireless device circuitry 309. Wireless device circuitry 309 may include any and all components required for transmission and reception of a wireless signal.

In some embodiments, wearable device antenna 310 may employ slit fed architecture. Wearable device antenna 301 may include a slit 340 between coupling portions 302a, 302b, and secondary radiating element 305. Secondary radiating element 305 may couple to coupling portions 302a and 302b across slit 340. Slit 340 may provide a distributed feed, permitting secondary radiating element 305 to excite primary radiating element 301 to activate in a wide frequency range. Slit 340 may also permit the activation of multiple current pathways having differing electrical lengths between the conductive coupling portions 302a, 302b, and primary radiating element 301.

In operation, wearable device antenna 310 may function as a multi-band antenna, transmitting in high-band frequencies between 1710-2700 MHz and low-band frequencies between 600-960 MHz. When provided with a low-band radiofrequency signal via feed line 307, secondary radiating element 305 may couple to and activate primary radiating element 301 to radiate in the low-band range via coupling elements 302a and 302b. Primary radiating element 301, activated via coupling elements 302a and 302b, may provide sufficient electrical length for efficient transmission in low-band frequency ranges. When provided with a high-band radiofrequency signal via feed line 307, secondary radiating element 305 may be configured to radiate as a folded monopole, utilizing primary radiating element 301 as a counterpoise. Secondary radiating element 305 may also be configured to couple to coupling element 302b and to cause at least a portion of primary radiating element 301 and coupling element 302b to cooperate to radiate in the high-band frequency range.

As similarly described above with respect to wearable device antenna 210, wearable device antenna 310 may provide unexpected performance for an antenna in low band frequency ranges, due to various combinations of the described features.

The foregoing descriptions of the embodiments of the present application have been presented for purposes of illustration and description. They are not exhaustive and do not limit the application to the precise form disclosed. Modifications and variations are possible in light of the above teachings or may be acquired from practicing the disclosed embodiments. For example, several examples of antennas embodying the inventive principles described herein are presented. These antennas may be modified without departing from the inventive principles described herein. Additional and different antennas may be designed that adhere to and embody the inventive principles as described. Antennas described herein are configured to operate at particular frequencies, but the antenna design principles presented herein are not limited to these particular frequency ranges. Persons of skill in the art may implement the antenna design concepts described herein to create antennas resonant at additional or different frequencies, having additional or different characteristics.

Other embodiments of the present application will be apparent to those skilled in the art from consideration of the specification and practice of the embodiments disclosed herein. It is intended that the specification and examples be considered as exemplary only.

What is claimed:

1. A watch, comprising:
   a primary radiating element configured to form at least a portion of an external frame of the watch;
   a first coupling element galvanically coupled to the primary radiating element, the first coupling element having a first length parallel to at least a portion of the primary radiating element;
   a second coupling element galvanically coupled to the primary radiating element, the second coupling element having a second length different that the first length parallel to at least a portion of the primary radiating element;
   a secondary radiating element configured to couple to the first coupling element and the second coupling element; and
   a feed element, configured to feed a radiofrequency signal to the secondary radiating element, and wherein the primary radiating element is configured to radiate in a first frequency range when the secondary radiating element receives a first radiofrequency signal in the first frequency range from the feed line and couples the first radiofrequency signal to the primary radiating element, and the secondary radiating element is configured to radiate in a second frequency range when receiving a second radiofrequency signal in the second frequency range.

2. The watch of claim 1, wherein the secondary radiating element includes a folded monopole element.

3. The watch of claim 1, wherein the primary radiating element is configured to form a closed loop portion of the external frame.

4. The watch of claim 1, wherein the primary radiating element is configured for directional radiation when activated by coupling with the secondary radiating element.

5. A watch, comprising:
   a body having an external band;
   at least one conductive element disposed on the external band and configured to form at least a portion of a primary radiating element;
   a first coupling element galvanically coupled to the primary radiating element, the first coupling element having a first length parallel to at least a portion of the primary radiating element;

a second coupling element galvanically coupled to the primary radiating element, the second coupling element having a second length different that the first length parallel to at least a portion of the primary radiating element;

a secondary radiating element configured to couple with the first and second coupling elements; and a feed line disposed to supply a radiofrequency signal to the secondary radiating element, wherein the primary radiating element is configured to radiate in a first frequency range when the secondary radiating element receives a first radiofrequency signal in the first frequency range from the feed line and couples the first radiofrequency signal to the primary radiating element, and the secondary radiating element is configured to radiate in a second frequency range when receiving a second radiofrequency signal in the second frequency range.

6. The watch of claim 5, wherein the secondary radiating element includes a folded monopole element.

7. The watch of claim 5, wherein the primary radiating element is configured for directional radiation when activated by coupling with the secondary radiating element.

* * * * *